United States Patent
Nyman et al.

(10) Patent No.: US 9,578,617 B2
(45) Date of Patent: Feb. 21, 2017

(54) ANONYMOUS DEVICE POSITION MEASURING SYSTEM AND METHOD

(71) Applicant: Walkbase Oy, Turku (FI)

(72) Inventors: Gabriel Nyman, Mariehamn (FI); Björn Sjölund, Turku (FI); Niclas Jern, Turku (FI)

(73) Assignee: Walkbase Oy, Turku (FI)

( * ) Notice: Subject to any disclaimer, the term of this patent is extended or adjusted under 35 U.S.C. 154(b) by 226 days.

(21) Appl. No.: 14/462,715

(22) Filed: Aug. 19, 2014

(65) Prior Publication Data

US 2016/0057727 A1 Feb. 25, 2016

(51) Int. Cl.
*H04W 4/02* (2009.01)
*H04W 12/00* (2009.01)
(Continued)

(52) U.S. Cl.
CPC .......... *H04W 64/00* (2013.01); *H04L 63/0407* (2013.01); *H04W 4/02* (2013.01);
(Continued)

(58) Field of Classification Search
CPC ........ H04W 4/02; H04W 64/00; H04W 84/18; H04W 4/028; H04W 4/04; H04W 4/021; H04W 12/00; H04W 12/02; H04W 12/12; H04W 84/20; H04W 28/021; H04W 76/021; H04W 4/025; H04W 40/20; H04W 88/02; G06Q 30/0261; G06Q 20/206; G06Q 20/383; G06Q 20/385; G06Q 20/382; H04L 63/0407; H04L 63/0414; H04L 63/0421
See application file for complete search history.

(56) References Cited

U.S. PATENT DOCUMENTS

| 5,633,858 A | 5/1997 | Chang et al. |
| 5,920,900 A | 7/1999 | Poole et al. |

(Continued)

FOREIGN PATENT DOCUMENTS

| EP | 2697956 A1 | 2/2014 |
| WO | 9829986 A1 | 7/1998 |

OTHER PUBLICATIONS

Levent Demir, et al.; "Analysing the privacy policies of Wi-Fi-trackers"; Author manuscript, published in "Workshop on Physical Analytics (2014)"; DOI: 10.1145/2611264.2611266; hal-00983363, version 1—Apr. 25, 2014; http://hal.inria.fr/docs/00/98/33/63/PDF/Wi-Fi_tracking_camera-ready.pdf.
(Continued)

*Primary Examiner* — Meless Zewdu
(74) *Attorney, Agent, or Firm* — Ziegler IP Law Group, LLC (57) ABSTRACT

A system for measuring in an anonymous manner one or more spatial positions of one or more user devices within a region, wherein the system includes a wireless arrangement for receiving signals from the one or more user devices for determining the one or more spatial positions of the one or more user devices, wherein the wireless arrangement is operable to receive one or more user identification codes from the one or more user devices, wherein the one or more user identification codes include N bits; the system is operable to apply a mapping function to map the one or more user identification codes to form one or more corresponding secondary identification codes by decreasing an entropy of the one or more user identification codes by K bits; and the system is operable to modify the one or more corresponding secondary identification codes by increasing entropy of the one or more corresponding secondary identification codes by M bits.

21 Claims, 3 Drawing Sheets

(51) Int. Cl.
  *H04W 12/02* (2009.01)
  *H04W 64/00* (2009.01)
  *H04L 29/06* (2006.01)
  *G06Q 30/02* (2012.01)
  *H04W 4/04* (2009.01)
  *H04W 84/18* (2009.01)

(52) U.S. Cl.
  CPC ........ *H04W 4/028* (2013.01); *G06Q 30/0261* (2013.01); *H04W 4/04* (2013.01); *H04W 84/18* (2013.01)

(56) References Cited

U.S. PATENT DOCUMENTS

| | | | |
|---|---|---|---|
| 6,084,966 A * | 7/2000 | Maebara | H04L 9/0662 380/43 |
| 6,230,231 B1 | 5/2001 | DeLong et al. | |
| 6,625,145 B1 * | 9/2003 | Winell | H04L 29/06 370/389 |
| 7,346,059 B1 | 3/2008 | Garner et al. | |
| 7,532,895 B2 * | 5/2009 | Hrastar | H04L 41/0893 455/456.1 |
| 7,793,098 B2 | 9/2010 | Perkins et al. | |
| 7,809,843 B1 * | 10/2010 | Denninghoff | H04L 67/14 709/228 |
| 8,155,058 B2 | 4/2012 | Iyer et al. | |
| 2004/0246986 A1 * | 12/2004 | Belcea | G01S 5/0252 370/444 |
| 2006/0120317 A1 * | 6/2006 | Zheng | H04L 29/12216 370/315 |
| 2008/0309556 A1 * | 12/2008 | Hohl | G01S 5/0289 342/451 |
| 2009/0059849 A1 * | 3/2009 | Namba | H04L 1/1825 370/328 |
| 2010/0067533 A1 * | 3/2010 | Yoshida | H04L 43/0847 370/401 |
| 2010/0228625 A1 | 9/2010 | Priyadarshan et al. | |
| 2012/0042098 A1 * | 2/2012 | Kasslin | H04L 9/3236 709/245 |
| 2012/0094685 A1 * | 4/2012 | Marsico | H04W 4/021 455/456.1 |
| 2012/0119927 A1 * | 5/2012 | Zhang | H03M 7/3066 341/79 |
| 2012/0136889 A1 | 5/2012 | Jagannathan et al. | |
| 2012/0257753 A1 | 10/2012 | Ochikubo et al. | |
| 2012/0309425 A1 * | 12/2012 | El Khayat | H04L 67/18 455/456.3 |
| 2014/0035764 A1 * | 2/2014 | Clissold | H03M 7/02 341/50 |
| 2014/0047128 A1 | 2/2014 | Correll | |

OTHER PUBLICATIONS

Kemal Bicakci, et al., "Pushing the Limits of Address Based Authentication: How to Avoid MAC Address Spoofing in Wireless LANs", World Academy of Science, Engineering and Technology, vol. 2 Jun. 26, 2008, pp. 198-207; International Science Index vol. 2, No. 6, 2008 waset.org/Publication/15752.

Marco Gruteser and Dirk Grunwald, "Enhancing Location Privacy in Wireless LAN Through Disposable Interface Identifiers: A Quantitative Analysis" Department of Computer Science, University of Colorado, Boulder, Co, 2005 Springer Science + Business Media, Inc. Manufactured in the Netherlands, 11 pages.

Extended European Search Report for Application No. 15176411. 5-1870, mailed Dec. 14, 2015, 8 pages.

* cited by examiner

ANONYMOUS DEVICE POSITION MEASURING SYSTEM AND METHOD

TECHNICAL FIELD

The present disclosure relates to anonymous device position measuring systems. Moreover, the present disclosure relates to methods of measuring one or more device positions in an anonymous manner. Furthermore, the present disclosure relates to computer program products comprising a non-transitory computer-readable storage medium having computer-readable instructions stored thereon, the computer-readable instructions being executable by a computerized device comprising processing hardware to execute aforementioned methods.

BACKGROUND

Conventionally, systems for measuring one or more spatial positions of one or more corresponding wireless communication devices, for example smart phones, within a given region are known. These systems operate, for example, by monitoring received strength of a wireless signal transmitted from a wireless device at a plurality of receivers disposed at mutually different spatial positions in respect of a given region; by trigonometric computations derived from data indicative of spatial positions of the plurality of receivers and their respective received signal strength, a spatial position of the wireless device within the given region can be determined. Alternatively, there are provided a plurality of transmitting devices disposed at mutually different locations within a region, wherein a wireless device is operable to receive wireless signals transmitted from the plurality of transmitting devices; by trigonometric computations derived from data indicative of spatial positions of the plurality of transmitting devices and their respective received signal strength at the wireless device, a spatial position of the wireless device within the region can be determined.

Such position measurement of wireless devices such as smart phones has been proposed. Smart phones are operable to transmit their MAC addresses which are received by a plurality of receivers disposed at mutually different spatial positions in respect of a given region. This enables the smart phones, from their MAC addresses, to be spatially tracked within the given region. Network interfaces in wireless devices have unique device codes called "media access control address", namely abbreviated to aforementioned "MAC address". MAC addresses are used as a network address for most IEEE802 network technologies, including Ethernet, WLAN and Bluetooth; "Ethernet", "WLAN" and "Bluetooth" are trademarks. This means that there is a unique MAC address in a given phone for cellular radio, Wi-Fi and Bluetooth (BT), for example.

It is known to employ hashing of MAC addresses in a context of positioning systems for UUID (unique user ID) generation in commercial products.

Figure 1:
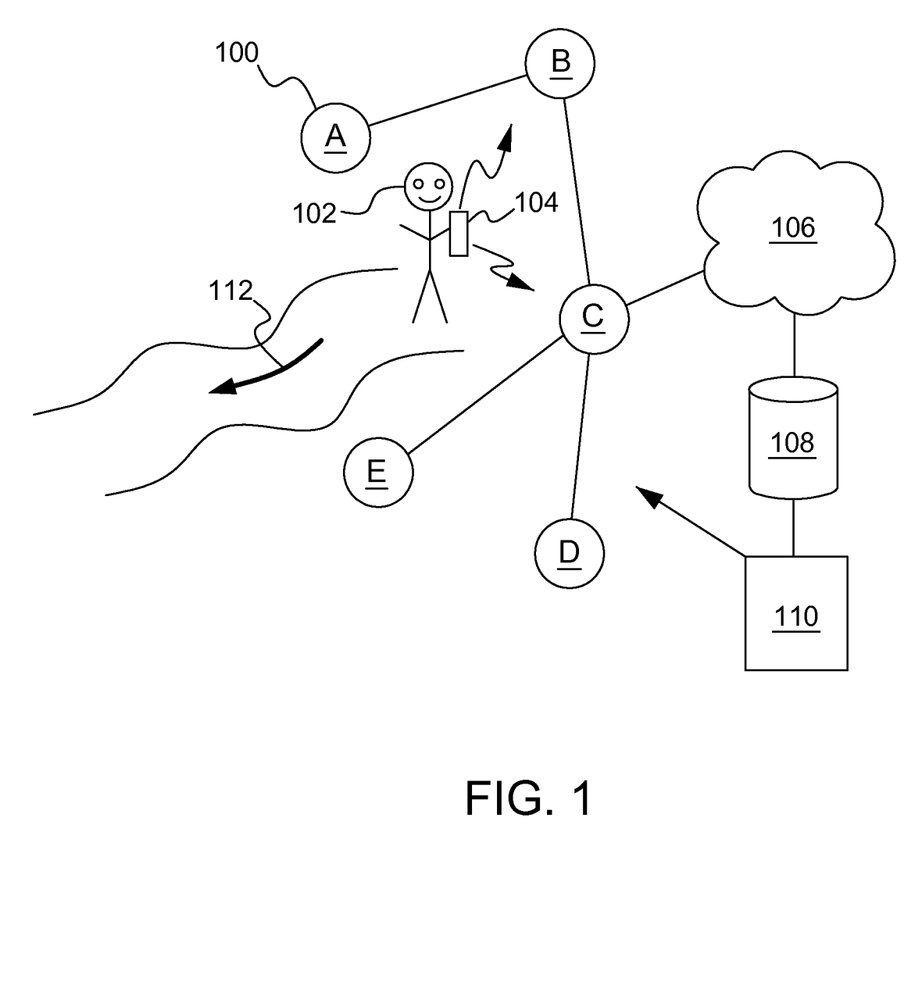
FIG. 1 is a schematic illustration of a high-level architecture of an anonymous device position measuring system pursuant to the present disclosure.

Referring to FIG. 1, a consumer 102 with his/her phone, which has Wi-Fi/BT installed and activated thereupon, is, for example, walking in a shopping mall. The phone continuously searches for available network connections by probing a wireless environment of the shopping mall in order to find a network that it is capable of joining. This involves sending a MAC address.

Sensors 100 receive one or more probes sent from the phone, thereby measuring signal strength and similar, and sending corresponding data to a server 108. Now, the server 108 is able to compute, as described in the foregoing, an approximate location of each MAC address, namely a spatial position of each consumer within the shopping mall.

An essential problem arising in practice in relation to FIG. 1 concerns privacy. The MAC address is a unique identifier that can be associated with a given consumer. Tracking individual consumers is undesirable from a privacy perspective. There might be, or might come, legislation related to privacy which limits storing of unique identifiers of any kind of related data without consent of a given user. In addition, there might be, or might come, legislation which prohibits collection of user identifications, namely "id's", even with the consent of the user. Moreover, system customers are also wary of consumer privacy.

SUMMARY

The present disclosure seeks to provide an anonymous device position measuring system, namely a system for measuring positions of one or more devices within a given spatial region in an anonymous manner.

Moreover, the present disclosure seeks to provide a method of anonymously measuring device position, namely a method of measuring positions of one or more devices within a given region in an anonymous manner.

According to a first aspect, there is provided a system as claimed in appended claim 1: there is provided a system for measuring in an anonymous manner one or more spatial positions of one or more user devices within a region, wherein the system includes a wireless arrangement for receiving signals from the one or more user devices for determining the one or more spatial positions of the one or more user devices, characterized in that the wireless arrangement is operable to receive one or more user identification codes from the one or more user devices, wherein the one or more user identification codes include N bits;

the system is operable to apply a mapping function to map the one or more user identification codes to form one or more corresponding secondary identification codes by decreasing an entropy of the one or more user identification codes by K bits; and the system is operable to modify the one or more corresponding secondary identification codes by increasing entropy of the one or more corresponding secondary identification codes by M bits.

Alternatively, the present disclosure provides a system as claimed in appended claim 2: there is provided a system for measuring in an anonymous manner one or more spatial positions of one or more user devices within a region, wherein the system includes a wireless arrangement for receiving signals from the one or more user devices for determining the one or more spatial positions of the one or more user devices, wherein the wireless arrangement is operable to receive one or more user identification codes from the one or more user devices, wherein the one or more user identification codes include N bits;

the system is operable to modify the one or more user identification codes by increasing entropy of the one or more user identification codes by M bits; and the system is operable to apply a mapping function to map the entropy-increased one or more user identification codes to form one or more corresponding secondary identification codes by decreasing an entropy of the one or more user identification codes by K bits.

The present invention is of advantage in that the system is capable of monitoring spatial positions of the one or more user devices in an anonymous manner, by employing a combination of the mapping function and a feature of modifying entropy after applying the mapping function.

Beneficially, embodiments of the present disclosure enable a degree of anonymity in respect of the one or more user devices to be adjustable, depending upon a manner in which the mapping function and the feature of modifying entropy are utilized. Optionally, the degree of anonymity is user-adjustable and/or adjustable by an operator of the system.

Optionally, in the system, the one or more user identification codes are one or more MAC codes of the one or more user devices.

Optionally, in the system, the mapping function is a logical operation. More optionally, in the system, the logical operation includes at least one of: a logical AND function, a logical OR function, a logical XOR function.

Optionally, the system is operable to modify entropy of the one or more corresponding secondary identification codes by spreading the one or more corresponding secondary identification codes pseudo-randomly around a post-ID space as employed by the system to represent the one or more user devices within the system.

Optionally, in the system, the wireless arrangement includes a plurality of nodes which are spatially distributed at mutually different spatial positions within the region.

Optionally, in the system, the nodes of the wireless arrangement are operable to form a self-configuring wireless communication network for communicating the one or more user identification codes and/or the one or more user identification codes in modified form within the system.

Optionally, in the system, the nodes of the wireless arrangement are operable to form a peer-to-peer (P2P) wireless communication network for communicating the one or more user identification codes and/or the one or more user identification codes in modified form within the system.

Optionally, in the system, the wireless arrangement is operable to utilize at least one node for checking a presence of the one or more user devices within the region.

According to a second aspect, there is provided a method of measuring in an anonymous manner one or more spatial positions of one or more user devices within a region of a system, wherein the system includes a wireless arrangement for receiving signals from the one or more user devices for determining the one or more spatial positions of the one or more user devices, characterized in that the method includes:
(a) operating the wireless arrangement to receive one or more user identification codes from the one or more user devices, wherein the one or more user identification codes include N bits;
(b) operating the system to apply a mapping function to map the one or more user identification codes to form one or more corresponding secondary identification codes by decreasing an entropy of the one or more user identification codes by K bits; and
(c) operating the system to modify the one or more corresponding secondary identification codes by increasing entropy of the one or more corresponding secondary identification codes by M bits.

Alternatively, according to the second aspect, there is provided a method of measuring in an anonymous manner one or more spatial positions of one or more user devices within a region of a system, wherein the system includes a wireless arrangement or receiving signals from the one or more user devices for determining the one or more spatial positions of the one or more user devices, wherein the method includes:
(a) operating the wireless arrangement to receive one or more user identification codes from the one or more user devices, wherein the one or more user identification codes include N bits;
(b) operating the system to modify the one or more corresponding user identification codes by increasing entropy of the one or more corresponding user identification codes by M bits; and
(c) operating the system to apply a mapping function to map the one or more entropy-increased user identification codes to form one or more corresponding secondary identification codes by decreasing an entropy of the one or more corresponding user identification codes by K bits.

Beneficially, in the method, a degree of anonymity in respect of the one or more user devices is adjustable, depending upon a manner in which the mapping function and the feature of modifying entropy are utilized. Optionally, the degree of anonymity is user-adjustable and/or adjustable by an operator of the system.

Optionally, in the method, the one or more user identification codes are one or more MAC codes of the one or more user devices.

Optionally, in the method, the mapping function is a logical operation. More optionally, in the method, the logical operation includes at least one of: a logical AND function, a logical OR function, a logical XOR function.

Optionally, the method includes operating the system to modify entropy of the one or more corresponding secondary identification codes by spreading the one or more corresponding secondary identification codes pseudo-randomly around a post-ID space as employed by the system to represent the one or more user devices within the system.

Optionally, the method includes spatially distributing a plurality of nodes of the wireless arrangement at mutually different spatial positions within the region.

Optionally, the method includes arranging for the nodes of the wireless arrangement to form a self-configuration wireless communication network for communicating the one or more user identification codes and/or the one or more user identification codes in modified form within the system.

Optionally, the method includes arranging for the nodes of the wireless arrangement to form a peer-to-peer (P2P) wireless communication network for communicating the one or more user identification codes and/or the one or more user identification codes in modified form within the system.

Optionally, the method includes arranging the wireless arrangement to utilize at least one node for checking a presence of the one or more user devices within the region.

According to a third aspect, there is provided a computer program product comprising a non-transitory computer-readable storage medium having computer-readable instructions stored thereon, the computer-readable instructions being executable by a computerized device comprising processing hardware to execute a method pursuant to the second aspect.

It will be appreciated that features of the invention are susceptible to being combined in various combinations without departing from the scope of the invention as defined by the appended claims.

DESCRIPTION OF THE DIAGRAMS

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE DISCLOSURE

In overview, the present disclosure is concerned with tracking of movements/locations of one or more persons, and providing value added services based upon data indicative of such tracked movements/locations; the one or more persons are equipped with one or more corresponding wireless communication devices, wherein such devices are referred to as being "mobile terminals". The popularity of wireless local area networks, for example WLANs, Wi-Fi, and such like, inside and around buildings makes positioning systems based on readily available received signal strength (RSSI) from access points (APs) desirable. A fingerprinting technique associates location-dependent characteristics such as RSSI values from multiple APs to a location, namely a location fingerprint, and uses these characteristics to infer the location. The collection of RSSI fingerprints from different locations are stored in a database, referred to as a "radio map", which is optionally used to compare to an observed RSSI sample vector for estimating the mobile terminal's location.

Referring to FIG. 1, there is shown a schematic illustration of a high-level architecture of an anonymous device position measuring system. In the system, there is included a set of sensors 100 (A, B, C, D, E) positioned in a given region such as in a department store, mall, shop, sports arena, and so forth. The sensors 100 are similar to APs, however not providing a communication service to mobile terminals. The sensors 100 are configured to receive radio signals from a mobile terminal 104 carried by a person 102. The radio signal from the terminal 104 can be any radio signal, but in present embodiment there are beneficially used Wireless Local Area Network (WLAN/Wi-Fi) signals.

The sensors 100, namely AP's, are operable to listen to receive wireless "pings", namely probes, wherein a Wi-Fi probe is a list of base stations where a given connection has been active, from mobile terminals, for example smart phones, which have their WLAN's active. A mobile device sends a Wi-Fi probe at a rate of typically 1 to 2 probes per minute. The sensors 100 do not reply to pings received thereat, namely they are passive in respect to terminals 104. The sensors 100 record signal strengths of WLAN transmission received from the mobile terminal 104 and a MAC address of the terminal 104. The sensors 100 communicate with each other in ad-hoc manner to form an ad-hoc network, for example a peer-to-peer (P2P) network to deliver received information of signal strength, MAC address and optionally other information. At least one of the sensors 100, namely "nodes", for example a node C, is connected to a communication network 106, for example the Internet, for example by using an ADSL connection or other connecting means, whether wired or wireless.

The information from the sensors 100 is received in the server system 108, for example implemented as a proprietary Walkbase server system; "Walkbase" is a trademark. The server system 108 calculates and records movement paths 112 of the person 102. The server system 108 is optionally further configured to send location related information, processed or unprocessed, to a third party service 110. The third party service 110 is optionally, for example, used to send direct advertisement messages to the terminal 104 of the person/user 102; optionally, the advertisements messages are pertinent to the spatial position of the person/user 102, for example a given section of a department store or shopping mall.

An aim of the system is to provide analytical services for customers that want to know how visitors, namely persons, shoppers et al., are behaving in the customers' premises and enable location based/aware services not hitherto otherwise possible to the user of the terminal, which is being positioned. This involves identifying, counting and tracking visitors with reasonable accuracy, and potentially providing location based/aware services. However, embodiments of the present disclosure seek to provide such analytical services in an anonymous manner, as will next be elucidated.

In overview, such anonymity for users is beneficially provided by removing or adding bits to device MAC address, hashing it and using part of the information in order to maintain consumer privacy in the indoor positioning system.

In describing embodiments of the present disclosure, the following terms are used, as defined in the foregoing:

"MAC": abbreviation for "medium access control"; and

RSSI: abbreviation for "received signal strength indicator".

Figure 3:
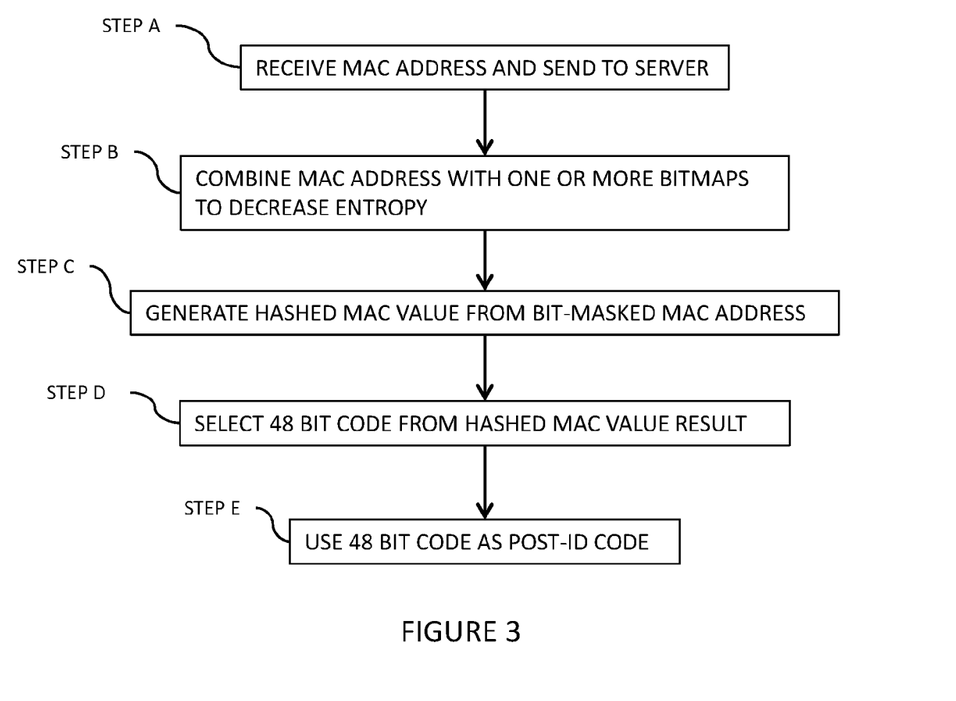
FIG. 3 illustrates steps for deriving a pseudo-unique identifier ID from a user's MAC address according to the present disclosure.

In embodiments of the present disclosure, there is derived a pseudo-unique identifier ID from the MAC address in such a way that it cannot be backtracked to the original MAC address and sufficiently provides customers' privacy requirements. In the aforesaid system, there is beneficially employed a method having the following steps as illustrated in FIG. 3:

STEP A: The MAC address of the consumer terminal 104 is received by the sensors 100 and sent to the server 108. Since it is unique, optionally, the MAC address as sensed by the sensors 100 has an associated code which is not stored in a server 108, or the code can be only stored there for limited time.

STEP B: To generate a non-unique code, namely an anonymous code, the MAC address is combined with one or more bitmasks which decreases entropy and intentionally causes collisions. A logical function used is beneficially either a logical AND function or a logical OR function, or some other simple logic function, for example a logical XOR function. In essence, this step B removes information, entropy, bits, and so forth from the original MAC address by making specific bits always 0 or 1.

STEP C: A hash function is used to generate a hashed MAC value from the bit-masked MAC address. For example SHA-1 hash coding is optionally used to generate for example 160-bit code from a 48-bit MAC address. This 160-bit code is unique. The hash is "salted", namely initialized, with a customer/region specific code, thus for different salt variables, the hashing will yield different results, thus separating the post-ID address spaces.

STEP D: a 48-bit code is selected from the hash result, typically its 48-first bits. This is an optional step, but is beneficially done because a 48-bit address space is often enough to accommodate all likely number of devices in practice.

STEP E: The generated code is used as the post-ID code. The one or more bitmasks in step B basically define the ambiguity of the post-ID code, namely a probability of false positives. That means the system customer, for example the user and/or an operator of the system, can define whether there shall be, for example, 1% or 10% probability for two users to have a same post-ID code.

Figure 2:
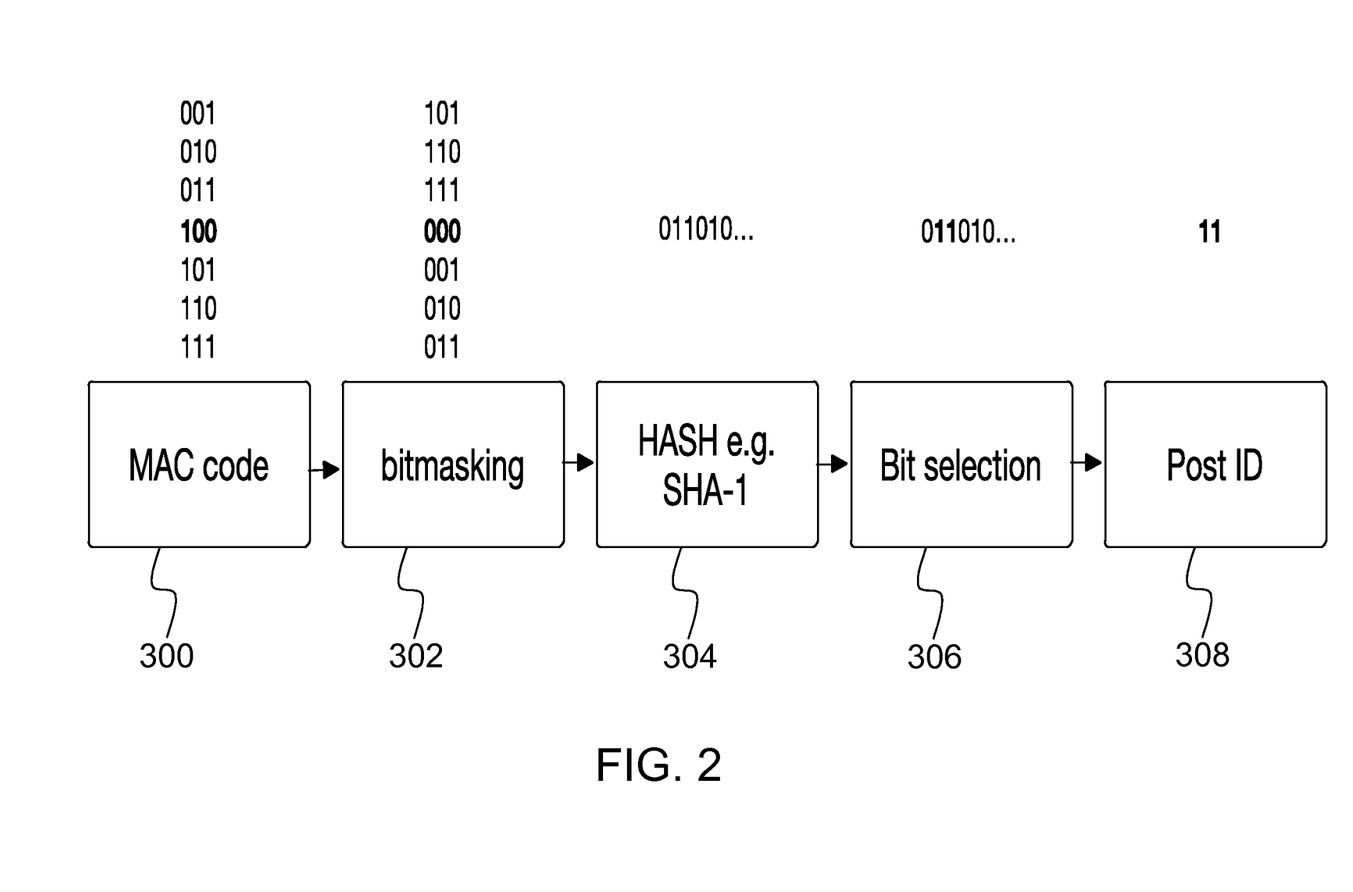
FIG. 2 is a further illustration of the steps of FIG. 3.

Steps A to E will be further elucidated with reference to FIG. 2, by way of a simplified method example:

Step 300: in this step, a MAC code is received from a user terminal. In practice, the MAC code is typically 48 bits long; here, there is beneficially used 3 bits for the sake of simplicity. In this particular example, the received MAC code is 100 (shown in bold numerals).

Step 302: the MAC code is masked by applying one or more bitmasks thereto. This step 302 essentially controls the ambiguity, namely the collision probability, of the post-ID code. Given that the logical function used in the example is a logical AND function, the number of zeroes in the one or more bitmasks define the ambiguity level. In a case of 10 zeroes in the mask, the original $2^{48}$ addresses map to $2^{38}$ addresses, and so forth. The collision probability is thus $2^{38}/2^{48}=2^{-10}$. By choosing the number of zeroes in the one or more bitmasks, the collision probability can thus be tuned, which is highly advantageous as an innovative feature. In the example, the bitmask is 011, thus 100 AND 011 yields 000.

Step 304: the MAC code is run through a hash function, for example SHA-1. Hash algorithms typically produce a long result: SHA-1 produces a 160-bit result. However, if there are only N choices in the initial space, there can be only $2^N$ results after hashing. SHA-1 is considered to be a fairly strong cryptographic, irreversible algorithm. This step has only a minor effect to the collision probability. Result of the hash in the example is 011010 . . .

Step 306: As the hash function spreads the source addresses fairly evenly, only 48 bits are taken of the hash result. This step has only a minor effect to the collision probability.

Step 308: this is the Post ID for the user terminal that can now be stored as it meets the privacy requirements.

Details of the aforementioned methods of the present disclosure will next be elucidated in greater detail.

Step B in the foregoing is advantageous, namely combining an original address, for example a MAC code, with a bitmask; this corresponds, in essence, to throwing away bits from the original MAC code, not the hashed one. Optionally, information reduction processes associated with step B are implemented through removing bits from the original MAC address.

Step C in the foregoing beneficially employs a hash function to generate hashed MAC addresses from the bitmasked MAC address. For example, as aforementioned, a SHA-1 hash code is optionally used to generate, for example, a 160-bit code from a 48-bit MAC address. This 160-bit code is beneficially substantially unique. The hash is optionally "salted", namely initialized with a customer/region specific code: thus, for different salt variables, the hashing will yield different result, thus separating the post-ID address spaces. Optionally, operations associated with step C are implemented at a beginning of the sequence of steps, providing a similar overall result, but a disadvantage with executing step C before step B is that there will be a lot less collisions as the hash functions spread the resulting identifiers evenly in the whole 48-bit address space when the original MAC codes are not randomly spread. Optionally, if for some reason there is a desire to keep operations associated with step C near the end of the sequence of steps, it is beneficial to hash once, then throw away bits, and then hash again. However, the embodiment as described in detail in the foregoing is simpler and only throws away some bits from the original MAC code, thus ensuring collisions which aid anonymity to be achieved in the system.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. A system for measuring in an anonymous manner one or more spatial positions of one or more user devices within a region, wherein the system includes a wireless arrangement for receiving signals from the one or more user devices for determining the one or more spatial positions of the one or more user devices, wherein
    the wireless arrangement is configured to receive one or more user identification codes from the one or more user devices, wherein the one or more user identification codes include N bits for each of the one or more user devices;
    the system is configured to apply a mapping function to map the one or more user identification codes to form one or more corresponding secondary identification codes by decreasing an entropy of said each of the one or more user identification codes by K bits; and
    the system is further configured to modify the one or more corresponding secondary identification codes by increasing an entropy of said each of the one or more corresponding secondary identification codes by M bits to generate a post ID code for each of the one or more user devices, wherein the post ID code is used to represent each of the one or more user devices when providing the one or more spatial positions for each of the one or more user devices.

2. The system as claimed in claim 1, wherein the one or more user identification codes are one or more MAC codes of the one or more user devices.

3. The system as claimed in claim 1, wherein the mapping function is a logical operation.

4. The system as claimed in claim 3, wherein the logical operation includes at least one of: a logical AND function, a logical OR function, a logical XOR function.

5. The system as claimed in claim 1, wherein the system is configured to modify the entropy of the one or more corresponding secondary identification codes by spreading the one or more corresponding secondary identification codes pseudorandomly around a post-ID space as employed by the system to represent the one or more user devices within the system.

6. The system as claimed in claim 1, wherein the wireless arrangement includes a plurality of nodes which are spatial distributed at mutually different spatial positions within the region.

7. The system as claimed in claim 6, wherein the nodes of the wireless arrangement are configured to form a self-configuration wireless communication network for communicating the one or more user identification codes and/or the one or more user identification codes in modified form within the system.

8. The system as claimed in claim 6, wherein the nodes of the wireless arrangement are configured to form a peer-to-peer (P2P) wireless communication network for communicating the one or more user identification codes and/or the one or more user identification codes in modified form within the system.

9. The system as claimed in claim 1, wherein the wireless arrangement is configured to utilize at least one node for checking a presence of the one or more user devices within the region.

10. A system for measuring in an anonymous manner one or more spatial positions of one or more user devices within a region, wherein the system includes a wireless arrangement for receiving signals from the one or more user devices for determining the one or more spatial positions of the one or more user devices, wherein the wireless arrangement is configured to receive one or more user identification codes from the one or more user devices, wherein the one or more user identification codes include N bits for each of the one or more user devices;

the system is configured to modify the one or more user identification codes by increasing an entropy of the one or more user identification codes by M bits; and the system is configured to apply a mapping function to map the entropy-increased one or more user identification codes to form one or more corresponding secondary identification codes by decreasing an entropy of said each of the one or more user identification codes by K bits to generate a post ID code for each of the one or more user devices, wherein the post ID code is used to represent each of the one or more user devices when providing the one or more spatial positions for each of the one or more user devices.

11. A method of measuring in an anonymous manner one or more spatial positions of one or more user devices within a region of a system, wherein the system includes a wireless arrangement for receiving signals from the one or more user devices for determining the one or more spatial positions of the one or more user devices, wherein the method includes:

(a) receiving one or more user identification codes from the one or more user devices, wherein the one or more user identification codes include N bits for each of the one or more user devices;

(b) applying a mapping function to map the one or more user identification codes to form one or more corresponding secondary identification codes by decreasing an entropy of said each of the one or more user identification codes by K bits;

(c) modifying the one or more corresponding secondary identification codes by increasing an entropy of said each of the one or more corresponding secondary identification codes by M bits to generate a post ID code for each of the one or more user devices; and (d) using the post ID code to represent each of the one or more user devices when providing the one or more spatial positions for each of the one or more user devices.

12. The method as claimed in claim 11, wherein the one or more user identification codes are one or more MAC codes of the one or more user devices.

13. The method as claimed in claim 11, wherein the mapping function is a logical operation.

14. The method as claimed in claim 13, wherein the logical operation includes at least one of: a logical AND function, a logical OR function, a logical XOR function.

15. The method as claimed in claim 11, wherein the method includes modifying the entropy of the one or more corresponding secondary identification codes by spreading the one or more corresponding secondary identification codes pseudo-randomly around a post-ID space as employed by the system to represent the one or more user devices within the system.

16. The method as claimed in claim 11, wherein the method includes spatially distributing a plurality of nodes of the wireless arrangement at mutually different spatial positions within the region.

17. The method as claimed in claim 16, wherein the method includes arranging for the nodes of the wireless arrangement to form a self-configuration wireless communication network for communicating the one or more user identification codes and/or the one or more user identification codes in modified form within the system.

18. The method as claimed in claim 16, wherein the method includes arranging for the nodes of the wireless arrangement to form a peer-to-peer (P2P) wireless communication network for communicating the one or more user identification codes and/or the one or more user identification codes in modified form within the system.

19. The method as claimed in claim 11, wherein the wireless arrangement is configured to utilize at least one node for checking a presence of the one or more user devices within the region.

20. A computer program product comprising a non-transitory computer-readable storage medium having computer-readable instructions stored thereon, the computer-readable instructions being executable by a computerized device comprising processing hardware to execute a method as claimed in claim 11.

21. A method of measuring in an anonymous manner one or more spatial positions of one or more user devices within a region of a system, wherein the system includes a wireless arrangement for receiving signals from the one or more user devices for determining the one or more spatial positions of the one or more user devices, wherein the method includes:

(a) using the wireless arrangement to receive one or more user identification codes from the one or more user devices, wherein the one or more user identification codes include N bits for each of the one or more user devices;

(b) modifying, via the system, the one or more corresponding user identification codes by increasing an entropy of said each of the one or more corresponding user identification codes by M bits;

(c) applying, via the system, a mapping function to map said each of the one or more entropy-increased user identification codes to form one or more corresponding secondary identification codes by decreasing an entropy of each of the one or more corresponding user identification codes by K bits to generate a post ID code for each of the one or more user devices; and (d) using the post ID code to represent each of the one or more user devices when providing the one or more spatial positions for each of the one or more user devices.

\* \* \* \* \*